US008003931B2

(12) United States Patent
Mason et al.

(10) Patent No.: US 8,003,931 B2
(45) Date of Patent: Aug. 23, 2011

(54) OPTICAL VEND-SENSING SYSTEM FOR CONTROL OF VENDING MACHINE

(75) Inventors: Paul L. Mason, Inwood, WV (US); David A. Sprankle, Hagerstown, MD (US)

(73) Assignee: Automated Mechandising Systems, Inc., Kearneysville, WV (US)

( * ) Notice: Subject to any disclaimer, the term of this patent is extended or adjusted under 35 U.S.C. 154(b) by 194 days.

(21) Appl. No.: 12/289,672

(22) Filed: Oct. 31, 2008

(65) Prior Publication Data

US 2009/0261236 A1 Oct. 22, 2009

(51) Int. Cl.

| | |
|---|---|
| ***H01J 40/14*** | (2006.01) |
| ***G06M 7/00*** | (2006.01) |
| ***G06F 11/00*** | (2006.01) |

(52) U.S. Cl. .......................... 250/222.1; 250/221; 221/7

(58) Field of Classification Search .................. 250/221, 250/222.1; 221/2, 7, 9, 21; 700/244; 340/552, 340/555–557, 674

See application file for complete search history.

(56) References Cited

U.S. PATENT DOCUMENTS

| | | | | |
|---|---|---|---|---|
| 3,739,372 | A * | 6/1973 | Schlisser et al. | 340/556 |
| 4,514,625 | A * | 4/1985 | Heiland | 250/221 |
| 5,583,334 | A * | 12/1996 | Baumann | 250/221 |
| 2002/0179620 | A1* | 12/2002 | Mason, II | 221/9 |

* cited by examiner

*Primary Examiner* — Thanh X Luu

(74) *Attorney, Agent, or Firm* — Davidson Berquist Jackson & Gowdey, LLP

(57) ABSTRACT

A transparent-front vending machine includes an optical vend-sensing system with an article sensing subsystem arranged athwart a vend space. The article sensing subsystem has two emitter/detector arrays, each having at least one emitter and a plurality of detectors. The emitter/detector arrays are arranged so that at least some electromagnetic radiation emitted by an emitter of the first array can be detected by at least two active detectors of the second array, and at least some electromagnetic radiation emitted by an emitter of the second array can be detected by at least two active detectors of the first array so that articles falling through the vend space will interrupt electromagnetic radiation between an emitter and at least one detector. At least two emitters are active at one time.

3 Claims, 9 Drawing Sheets

OPTICAL VEND-SENSING SYSTEM FOR CONTROL OF VENDING MACHINE

RELATED APPLICATIONS

This application is related to and claims priority from U.S. Provisional Patent application No. 60/586,298, titled "Optical Vend-Sensing System For Control Of Vending Machine," filed Jul. 9, 2004, the contents of which are incorporated herein by reference.

FIELD OF THE INVENTION

This invention relates to a machine that dispenses objects and detects the dispensed objects with an optical sensor. More particularly, this invention relates to an optical vend-sensing system and a vending machine that has an optical vend-sensing system.

BRIEF DESCRIPTION OF THE DRAWINGS

The invention is better understood by reading the following detailed description with reference to the accompanying drawings in which.

DETAILED DESCRIPTION OF THE PRESENTLY PREFERRED EXEMPLARY EMBODIMENTS

Background

Figure 1:
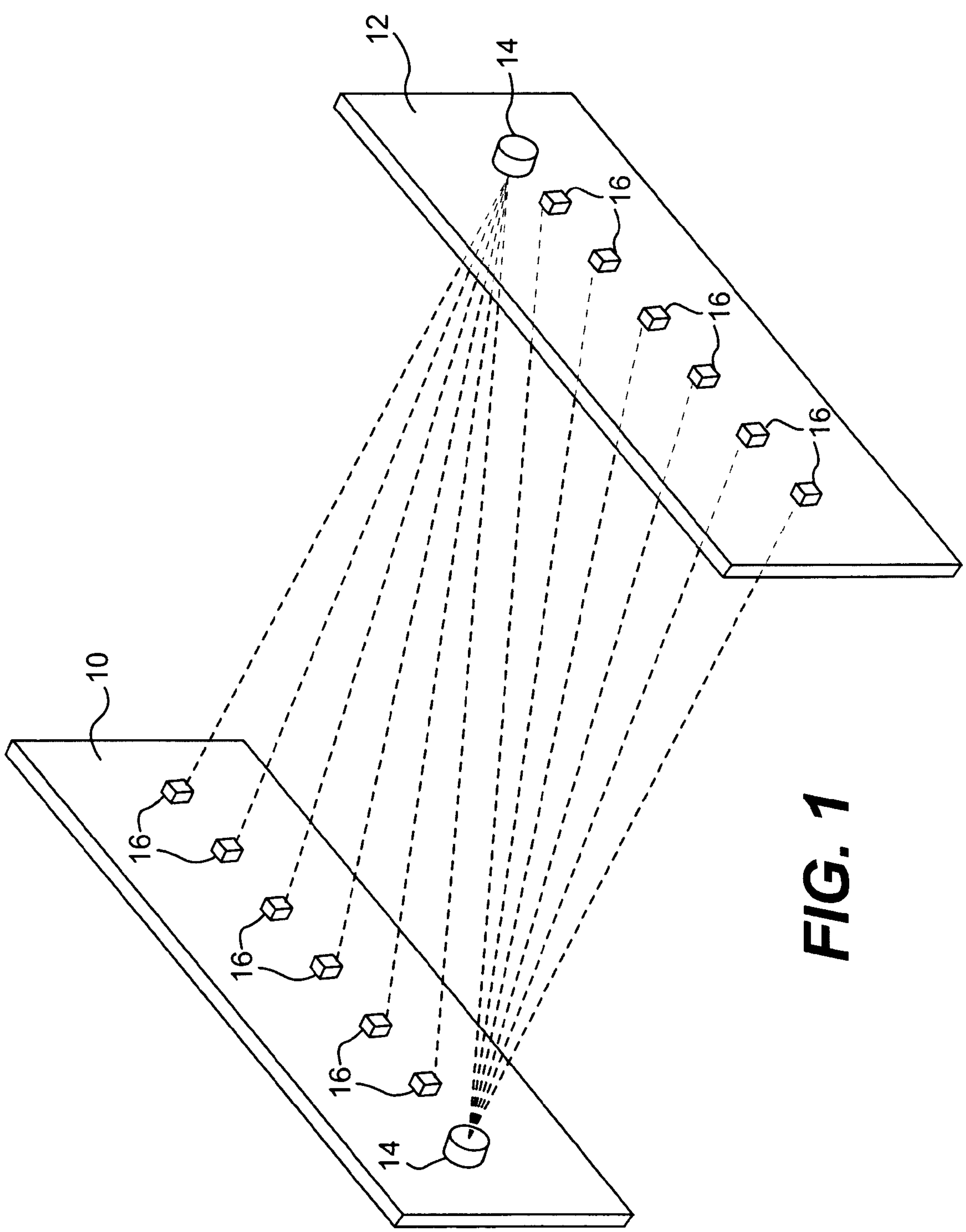
FIGS. 1-7 depict detector mechanisms according to embodiments of the present invention.

In a typical glass-front vending machine, the user of the machine sees a glass-fronted cabinet, with a selector panel located off to one side of the glass. Through the glass, there can be seen an array of articles, typically packaged snack foods arranged in horizontal columns which extend horizontally in a front-to-rear depthwise direction, with a plurality of columns at each of several vertically spaced levels. At each level the articles are pocketed in-between adjacent turns of respective spirals arranged one or two to a column. Each spiral has an axially central rearwardly projecting stem at its rear, which is plugged into the chuck of a respective motor assembly mounted to the rear of a tray. When a user makes the requisite payment to the machine and makes a desired selection on the selector panel, the spiral or spirals for the respective column begin to turn causing all of the packaged articles received among the spiral turns in that column to advance. If the vending machine is working properly, the respective spiral or spirals turn sufficiently to cause the leading packaged article in the respective column to be conveyed sufficiently far forwards that the package loses support provided from underneath by a respective tray, and tumbles down past the front of the respective shelf, through a vend space between the fronts of the columns and the back of the glass front, into an outlet bin, from which the user can retrieve it, typically by temporarily pushing in a hinged from above, normally closed door.

Again, if the machine is working properly, the respective spiral or spirals cease being turned by the respective motor assembly before the next-in-line, newly leading package in the respective column mistakenly becomes conveyed so far forwards that it, too, falls off the tray, down through the vend space and becomes vended without a requisite payment having been made.

Several different unplanned occurrences can occur, and the possibility and likelihood of their occurrence complicates the design of glass-front vending machines.

It is important that users, upon making requisite payment, be reliably vended the product which they have selected, without any deficiency or bonus, and without any need, or apparent desirability for expending unusual effort, or that the user automatically be provided a return of payment, or the opportunity to make another selection.

Spatial orientation of packages and wrinkling of packaging, unusual distribution of contents of a package, unusual tumbling of a package through the vend space, an empty pocket in a spiral and similar factors all can cause mis-vending, particularly if the machine is one in which a spiral is made to turn through only a predetermined angular distance for vending a selected product, or the package being vended, depending on how it falls, can bypass a detector meant to terminate rotation of the respective spiral or spirals upon detecting that a package has been vended.

Many glass-front vendors are modularly constructed, so that the number of vertically-spaced rows of product columns, and/or the number of laterally spaced columns per row can be changed either at the time the machine is ordered by its purchaser, or in the field, or both. This fact also complicates provision of reliable vending, particularly if adding and deleting columns necessitates adding and deleting sensors and making sure that the sensors are properly positioned and correctly operating. Addition of sensors also adds to expense.

It is known in the art to provide an emitter and detector which provide a beam in a confined space through which the vended product will fall. However, there is some chance that the falling product, through happenstantial orientation will fail to break the beam, or will apparently fail to break the beam, and therefore not be detected. There is also a possibility that in constricting the space through which the product must fall, happenstantial orientation will cause the product to bridge and become lodged in the constricted space, having been detected but not having been successfully vended.

Some vend sensors rely on the impact on the outlet chute of a comparatively heavy vended article such as a can or bottle in order to sense as a vibration. Such sensing is not economically feasible where at least some of the products being vended are very light in weight, such as is the case where a small number of large potato chips are presented in a facially large but light weight package.

A particularly difficult situation is presented when some of the products to be dispensed are large so that a large transverse cross-sectional area is required for the vend space, but others of the products are so small that an optical beam meant to be broken by the product could be missed due to happenstantial path of movement and changing spatial orientation of the falling product being vended.

U.S. Pat. Nos. 6,384,402, and 6,794,634, which claims priority thereto, both assigned to the assignee of the present application and both of which are incorporated by reference herein, disclose optical vend sensing systems that are designed to provide an improved vend sensing system.

Description

The present invention includes several embodiments of an optical vend sensing system that are particularly adapted for use in a glass front vending machine, e.g., of the type disclosed in U.S. Pat. No. 6,384,402, although the present invention can also be used in other types of machines. In the example of a glass front vending machine, the optical vend sensing system is preferably positioned in the machine to detect articles which pass through the vend space.

Figure 8:
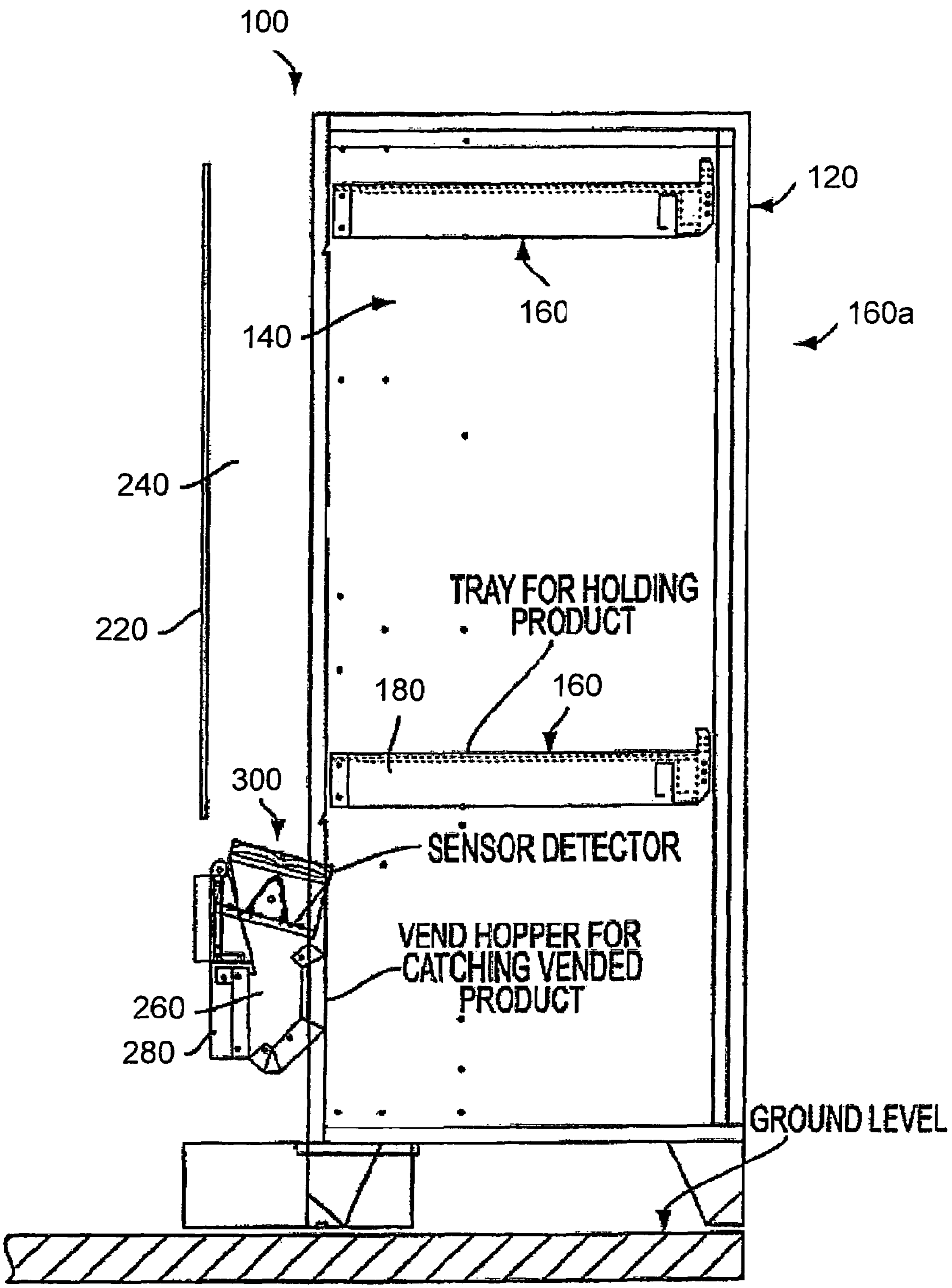
FIG. 8 (which corresponds to FIG. 1 of U.S. Pat. No. 6,384,402, which has been incorporated herein by reference) is a schematic vertical longitudinal sectional view of a glass front vending machine provided with an optical vend sensor.

An exemplary vending machine in which the optical vend-sensing system of the invention may be provided and used, is schematically illustrated at 100 in FIG. 8. Much of the conventional structure has been omitted. In general, the vending machine 100 is shown including a cabinet 120 having opposite sidewalls, a back wall, a top wall and a bottom wall which cooperatively define a forwardly facing cavity 140 arranged to have a plurality of tray assemblies 160 mounted therein at a plurality of vertically spaced levels. In general, the vending machine has an electromechanical dispensing unit 160*a*. In the example illustrated in FIG. 8, the electromechanical dispensing unit 160*a* includes the tray assemblies 160. Each tray assembly 160 has a plurality of motorized horizontally arranged spirals which are spaced from one another widthwise of the tray, and each of which extends longitudinally in a front-to-rear depthwise direction of the tray. Each spiral plugs into the driving chuck of a respective drive motor which is arranged to undirectionally rotate the spiral about the longitudinal axis of the spiral. In addition to the left, right upstanding flanges 180 used for mounting the tray assembly to the cabinet 120 preferably using drawer-mounting hardware which permits each tray assembly to be pulled out like a drawer, and a rear flange for mounting each motor assembly, the tray assembly includes a horizontal tray surface which underlies all of the spirals to provide support for the spirals and for the packaged products that are received in the respective upwardly opening pockets formed between neighboring turns of the respective spirals. Some columns may have one spiral per column; others may have two coordinately counter rotated spirals per column, with upstanding sidewall flanges mounted on the tray to divide columns from one another.

Spaced, for example, about 9 inches (23 cm) in front of the front edges of the tray assemblies as a panel in an openable/lockable door (not shown), is a glass front 220, through which a prospective customer can view the leading packaged products available for being vended upon operation of the machine. The door, to one side of the glass front, further includes a selector panel, or generally a payment and selection unit, (not shown) which includes means for accepting payment from the user, and for the user to select which column he or she wishes to receive the leading packaged product from. Vending, upon selection, is accomplished by causing the respective motor assembly or assemblies for the spiral or spirals of the respective column to turn through a sufficient angular distance, as to advance all of the products nested in the turns of the respective spiral or spirals forward such that the leading one loses support from below as it reaches the front of the respective tray support surface aid the runout at the front end or ends of the respective spiral or spirals, and drops through the vend space 240 behind the glass front 220, down into a vend hopper 260, from which it can be retrieved by the customer, by temporarily pushing in from the bottom on the top-hinged, resiliently urged closed door 280. (Typically, the door 280 is the outer part of a double-door arrangement configured such that as the user pushes in the outer door, a normally open inner door (not shown) at the top of the vend hopper correspondingly temporarily closes, for denying the user upward access to the vending machine cavity 140 via the vend hopper door 280.

Figure 9:
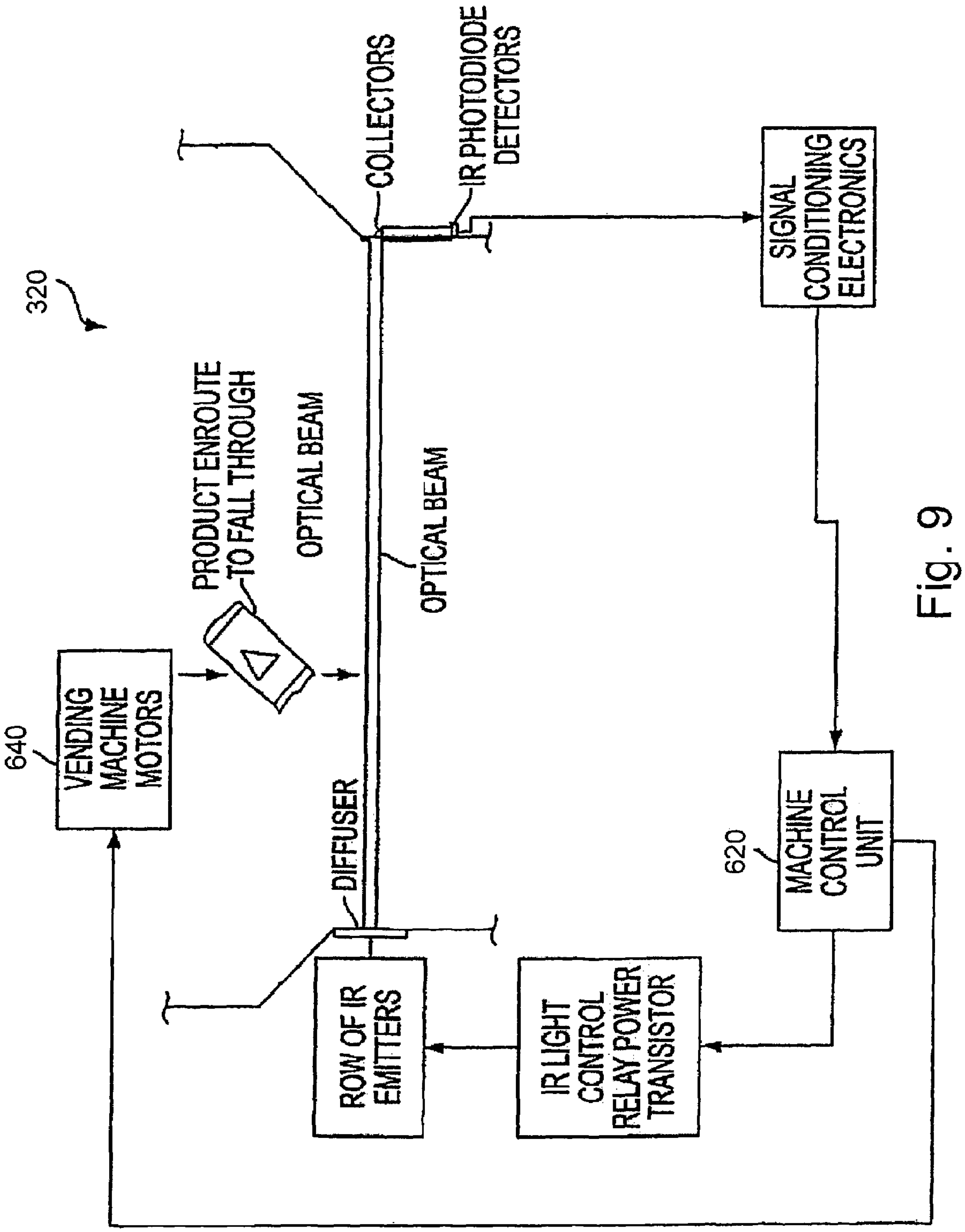
FIG. 9 (which corresponds to FIG. 2 of U.S. Pat. No. 6,384,402) is a block diagram of elements of an embodiment of an optical vend sensor.

An embodiment of the optical vend-sensing system 320 is schematically and diagrammatically illustrated in FIG. 9. The system of FIG. 9 further includes vending machine control unit 620 of the vending machine 100, to which the vending machine motors 640 (i.e. for turning the spirals) are operatively connected.

FIG. 1 shows two emitter/detector arrays, each having a single optical emitter 14 and a plurality of detectors 16, generally positioned in a straight row, although other arrangements can be used. In some preferred embodiments, the emitter/detector arrays are mounted on circuit boards 10 and 12, which are preferably identical and can be merely reversed for installation opposite each other. An alternate number of emitters and detectors can be used on each board. For example, in some presently preferred embodiments, each array has one or two emitters (which may be adjacent) and between twelve and fourteen detectors. In some embodiments, the two (or more) emitters are on one end of the array. In some embodiments, there is at least one emitter on one end of the array, and at least one other emitter on the other end of the array, with the plurality of detectors being positioned between them.

The positioning of the emitters and detectors can also be altered. For instance, the emitter does not have to be at the end of each array, as shown in FIG. 1, but can be positioned somewhere in the middle of the array, as shown, for example, the configuration depicted in FIG. 2. However, positioning the emitters on the ends of the arrays minimizes dead spots in the sensed area.

Those of skill in the art will realize that the relative spacing of the emitters and detectors on an emitter/detector array depends on the number of emitters and/or detectors and on how far apart the arrays are to be spaced and on the expected size of articles to be vended.

In some presently preferred embodiments, each array has fourteen (14) detectors spaced approximately 0.45 inches apart and one emitter (at the end). The emitter is not spaced 0.45 inches from its closest detector.

During operation, each emitter 14 is energized (either constantly or pulsed) and the opposing detectors 16 are checked to determine if they are receiving light from the opposing emitter 14. The detectors may be checked one at a time (sequentially or in any order) or simultaneously or in groups. The emitters/detector arrays need not be mounted to a circuit board but can be positioned and connected to the vending machine in other manners.

Figure 2:
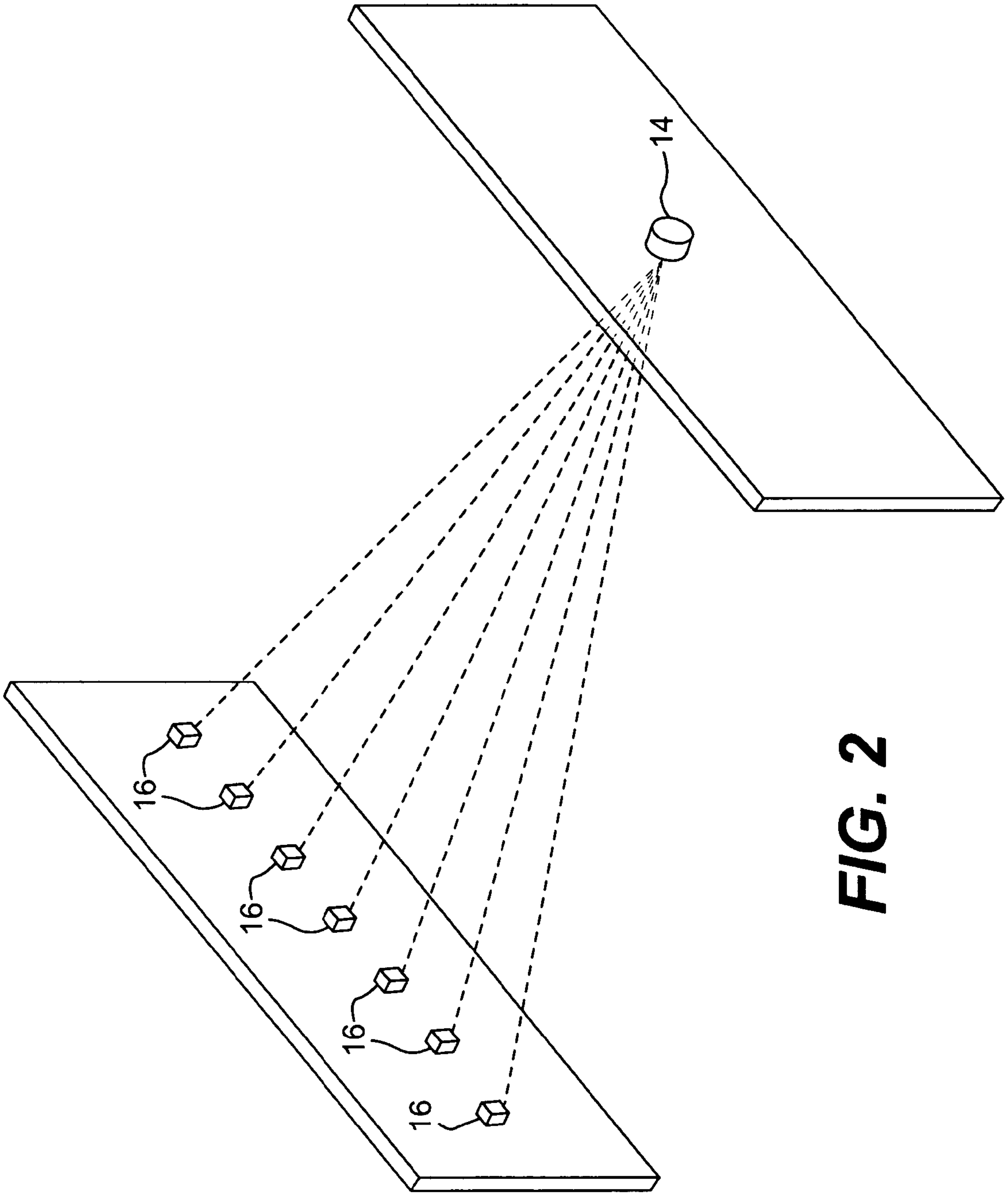

FIG. 2 shows an embodiment of the present invention that uses one emitter 14 on one side and a plurality of detectors 16 on an opposing side. The emitter 14 is energized (either constantly or pulsed) and each detector 16 is checked to see if it received or is receiving light or is not because a vended object is obstructing the light. Again, the detectors may be checked one at a time (sequentially or in any order) or simultaneously or in groups.

Figure 3:
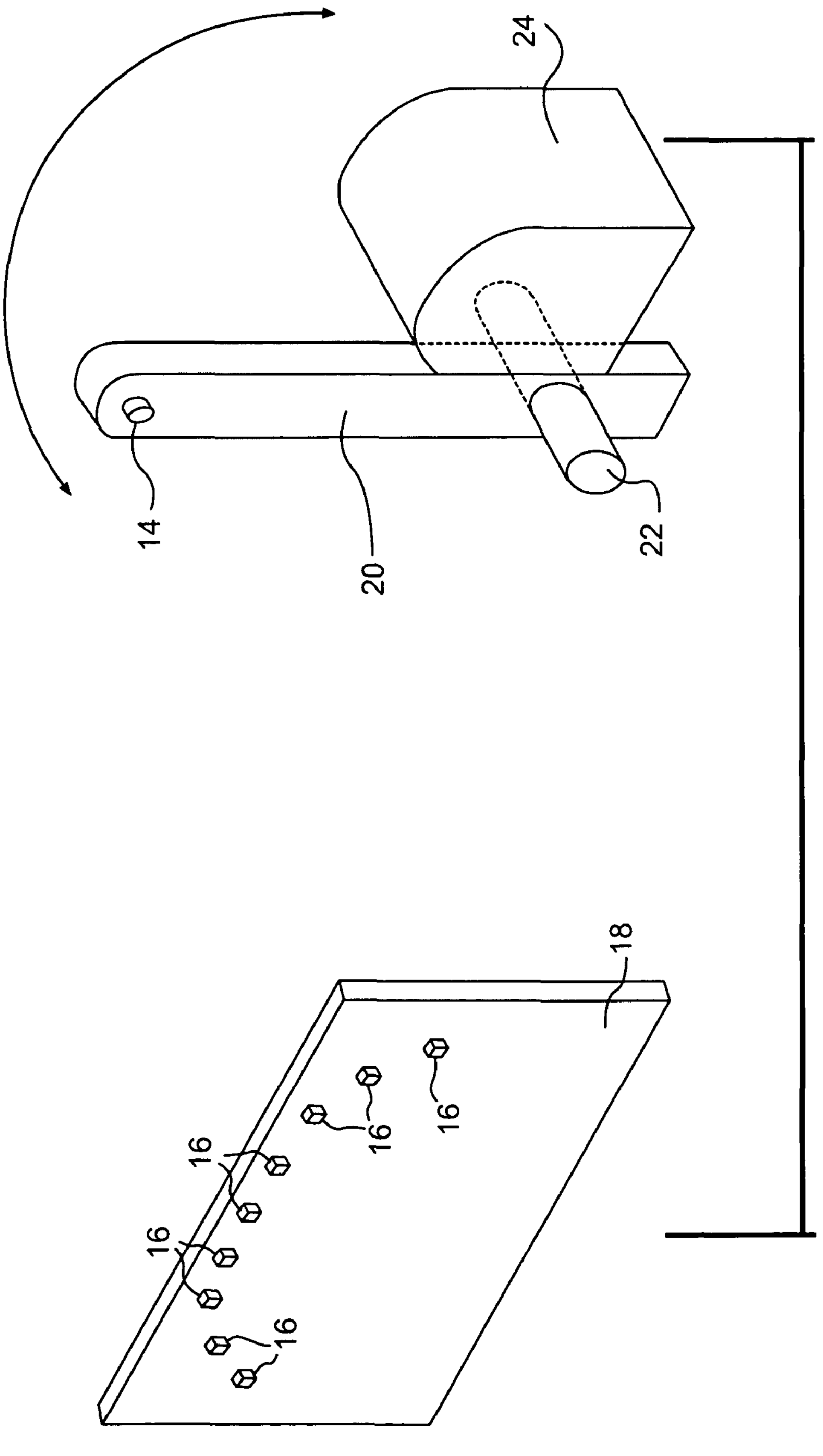

FIG. 3 shows an embodiment of the present invention in which a plurality of detectors 16 are positioned, e.g., on a circuit board 18, in a stationary manner (FIG. 3A) while an emitter 14 is mounted on an oscillating pendulum arm 20 (FIG. 3B). In some embodiments, the arm 20 is mounted to shaft 22. Some mechanism such as, e.g., a motor 24, is used to cause the arm to oscillate. Instead of a motor 24, an electromagnet in combination with a spring art may be used to produce the required oscillation. Regardless of the mechanism, the emitter 14 is driven along an arc in an oscillating manner. The detectors 16 may be mounted on a circuit board or on some other location. In operation, the detectors 16 are checked to determine if there is an obstruction between the emitter and one or more detectors. In some embodiments, the detectors can be positioned in an arc corresponding to the arc of the emitter, although this is not required and they can be mounted in a straight line or other geometry. The range and speed of oscillation of the emitter can be varied as desired, but in a preferred manner, the arc of oscillation will span or substantially span the vend space. This embodiment could also be reversed with one or more fixed emitters and an oscillating detector. In one embodiment, the base drives the pendulum arm via use of an electromagnet and spring arm.

Figure 4:
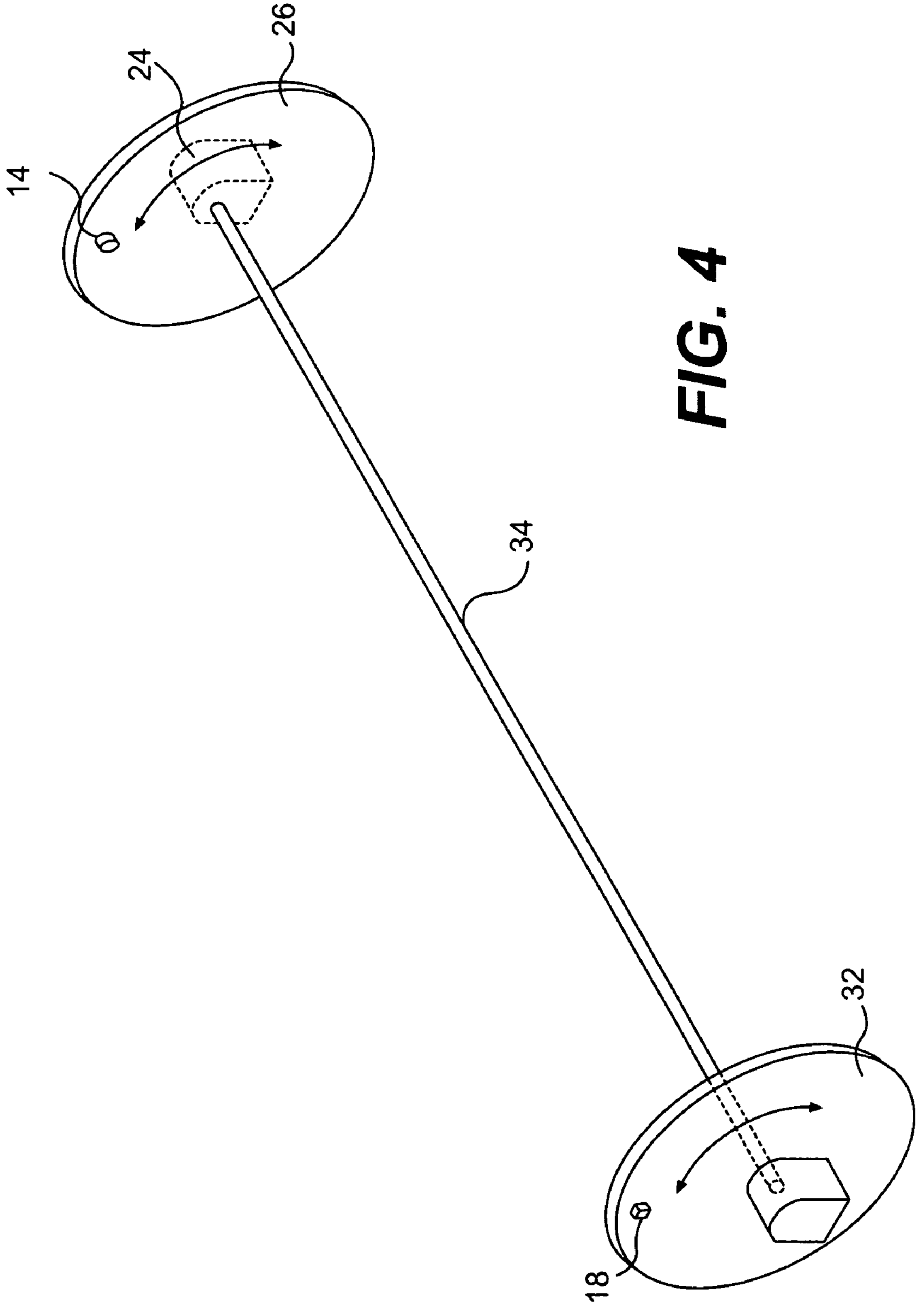

FIG. 4 shows an embodiment where an emitter 14 and detector 18 are mounted on opposing wheels 26 and 32, respectively, both of which move. The movement of the wheels can be a rotary movement or an oscillating movement. They can move in unison to maintain their relative positions to one another or move independently of one another. Each wheel (26, 32) could have multiple emitters and/or detectors and each could be functional for only a portion of the cycle. One reason to have the emitter/detector non-functional for part of their cycle is that there may be obstructions (such as the delivery bin) for part of the cycle. In such as this case, two emitters can be mounted on one wheel (e.g., 180 degrees apart) and two detectors can be mounted on the other wheel (e.g., 180 degrees apart). The processor then can simply ignore a signal from the detector for the part of the cycle when the emitter/detector pair is obstructed by the bin. During this time, the processor would consider the signal from the other emitter/detector pair as valid. Of course, more than two emitters and/or detectors can be used and each wheel can have both emitters and detectors (not just one or the other). The movement of the wheels 26 and 32 can be maintained with respect to one another by interconnecting the wheels with a shaft 34. In such cases, one motor 24 can drive both wheels. Alternatively, the separate wheels can be driven by separate motors and electronically controlled to move together. In one embodiment, the emitter(s) and detector(s) can rotate in opposite directions. This can be through a geared arrangement or can be accomplished via use of separate driving motors. The speed of movement can be set as desired but should be set fast enough to detect a product falling through the vend space. Each wheel can be moving at a different speed.

Figure 5:
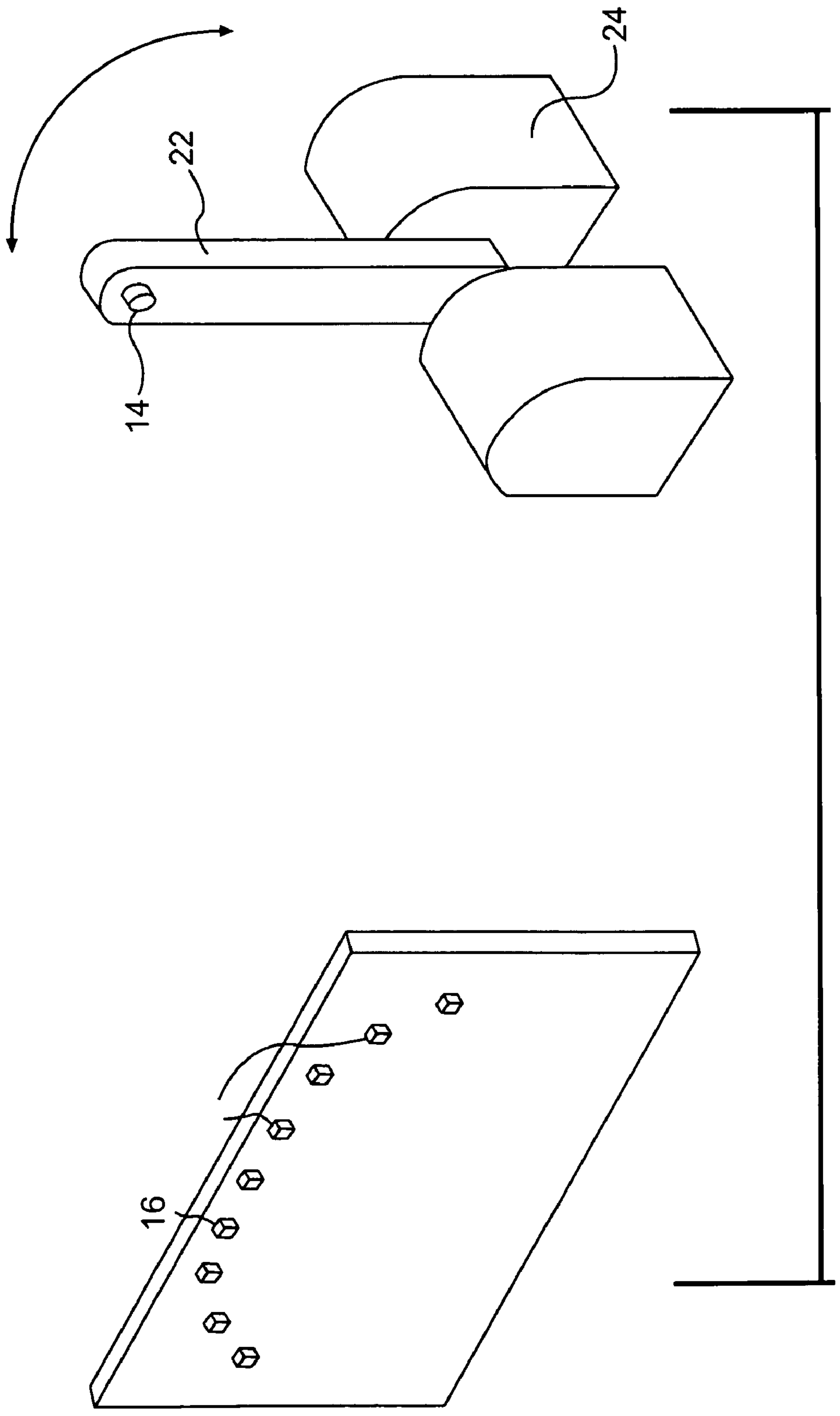

FIG. 5 shows an embodiment combining features of the embodiments shown in FIGS. 3 and 4. In this embodiment, the detector 14, mounted on pendulum arm 22 of base of motor 24, is rotated on one side and a plurality of detectors 16 are fixed on the other side. Alternatively, the detector(s) can move and the emitter(s) be fixed.

Figure 6:
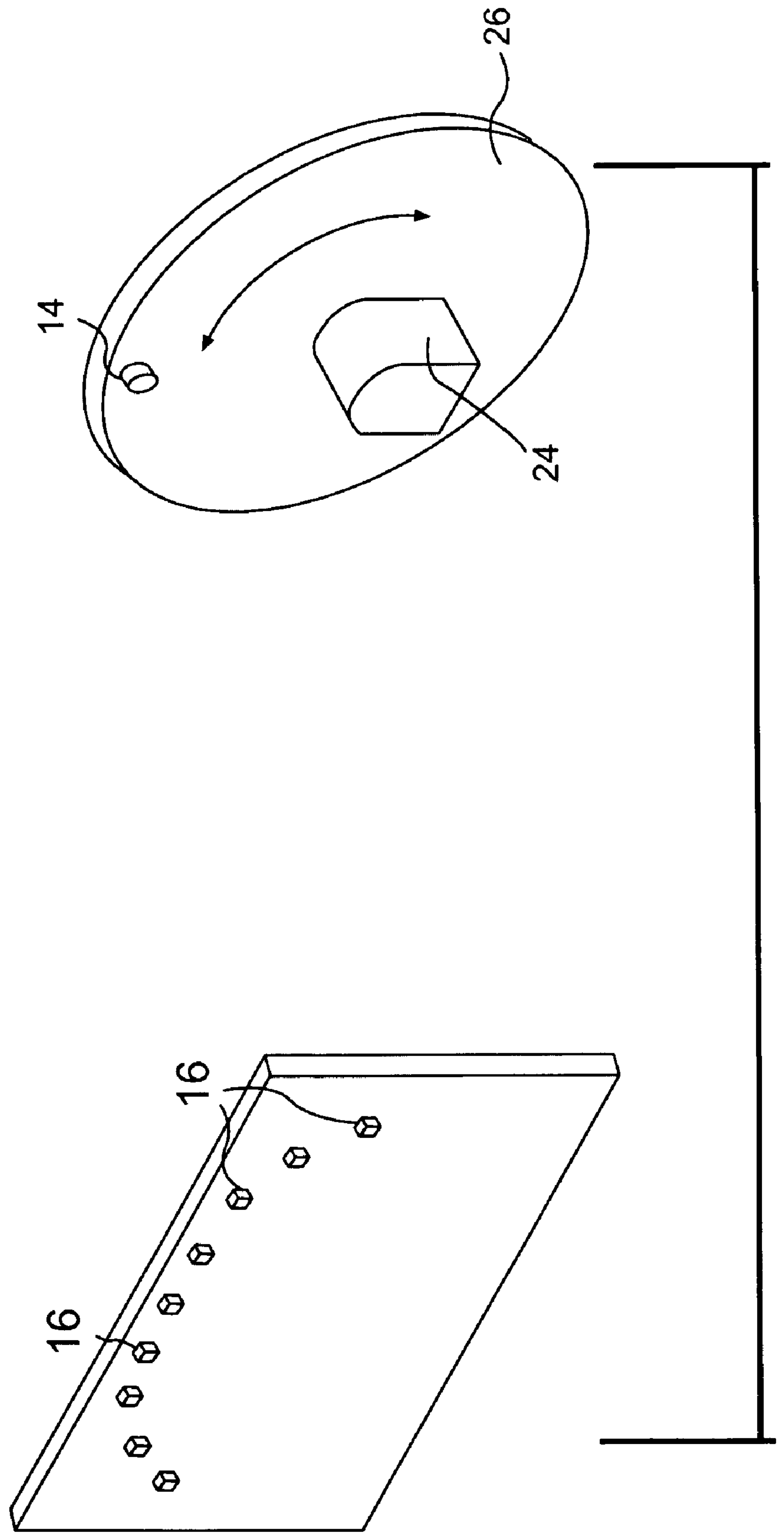

FIG. 6 shows an embodiment similar to that of FIG. 5, but with the emitter 14 mounted on a rotating (or oscillating) wheel 26. Alternatively, the detector(s) can move and the emitter(s) be fixed.

Figure 7:
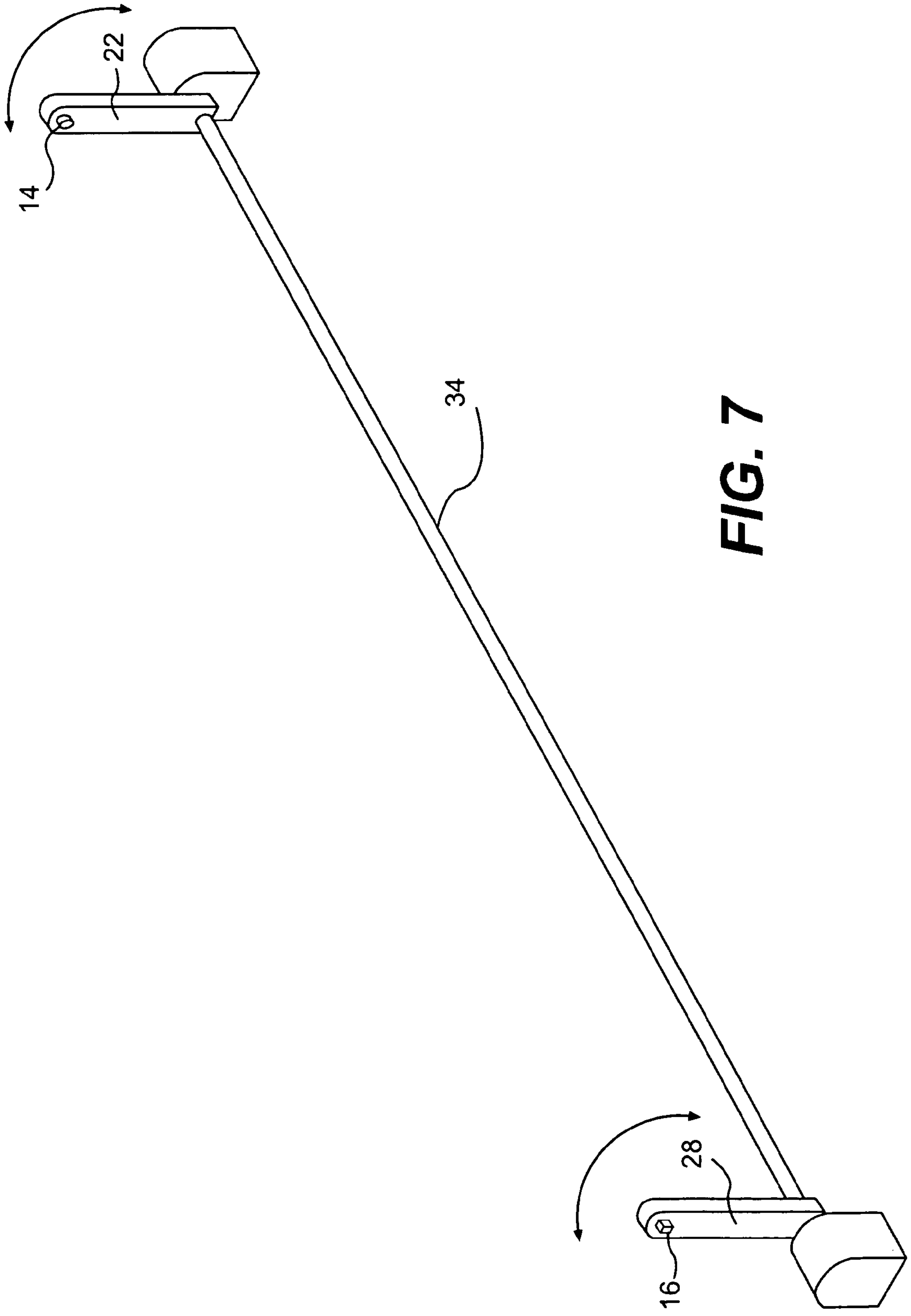

FIG. 7 shows an embodiment similar to that of FIG. 4 but with the emitter 14 and detector 16 mounted on rotating or oscillating pendulum arms 22 and 28, respectively.

Within a vending machine, the positioning of the emitter/detector units can be below the article vending units. For instance, in one embodiment, the emitter and detector units substantially extend a depth, front to rear of the machine, of the area through which vended products naturally fall. Other placements can also be used. For instance, the system shown in FIG. 2 could be adapted and arranged such that the emitter is mounted to the top inside door of the vendor and the detector(s) mounted to the bottom inside of the door. In this case, the beam(s) would be almost vertical.

In preferred versions of the embodiments disclosed herein, the emitters are not operated in a multiplexed manner.

In each of the embodiments disclosed above, the emitting of the signals and detecting of the emitted signals can be controlled through a CPU or other processing circuitry, hardware or software to detect an interruption of light from the detector(s) to the emitter(s) corresponding to a product falling through the vend space.

A logic circuit can be used with the detectors which allows conclusion of a vend on a detected occlusion of light to the detector of up to 100% of the corresponding light emitted. For instance, the logic circuit can be set to allow conclusion of the vend if the occlusion of light is in the range of 50-100% of the emitted light, or even less under certain circumstances.

The spacing between the detectors can be set as desired to provide a desired balance between more accurate sensing (i.e., closer spacing, thus requiring more detectors) and cost (i.e., larger spacing, requiring fewer detectors). Generally, the closer the spacing of the detectors, the more likely that an article dropping past the detectors will block a high percentage of the emitted light received by one or more of the detectors to more accurately sense a vend.

Where at least two emitters are used, with corresponding detectors positioned to receive the emitted light, the light of the different emitters can be pulsed at different frequencies and the detectors set to detect/signal only the light received at the pulsed frequency corresponding to the counterpart emitter. This can provide more accurate sensing by limiting consideration of emitted light not corresponding to the emitter(s) paired with the detector(s).

The light emitters and detectors may be of any type, though infrared emitters and detectors are preferable.

It is intended that various aspects of the different embodiments can be combined in different manners to create new embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. In a transparent-front vending machine which has at least one mechanism arranged for initiating operation upon selection by a customer for vending an article into a vend space through which the article falls freely into a customer-accessible hopper, an optical vend-sensing system comprising:

a pair of movable members positioned on opposite sides of the vend space;

each of the movable members including at least one emitter and at least one detector;

the pair of movable members exhibiting movement that is relative to the vend space so that electromagnetic radiation emitted from the emitters will create a dynamic detection zone that substantially spans a cross-section of the vend space;

whereby at least some electromagnetic radiation emitted by each of said at least one emitter can be detected by opposing detectors so that articles freely falling through the vend space will interrupt electromagnetic radiation between at least one emitter and at least one detector;

(B) a machine control unit arranged to control operation of the respective at least one mechanism; and (C) control circuitry operatively connecting the article sensing system with said machine control unit, and arranged to cause the machine control unit to complete a vend operation procedure of the at least one mechanism upon the article sensing system sensing a transition of a vended article through the vend space.

2. A vending machine as in claim 1 wherein the movable members are wheels.

3. A vending machine as in claim 1 wherein at least one of the movable members are arms.

* * * * *